United States Patent [19]

van Donkelaar

[11] 4,151,847

[45] May 1, 1979

[54] DEVICES FOR REMOVING BRUSSELS SPROUTS FROM THEIR STALKS

[76] Inventor: Jan A. van Donkelaar, Vlietkade 11C, Zevenhuizen, Netherlands

[21] Appl. No.: 780,442

[22] Filed: Mar. 23, 1977

[30] Foreign Application Priority Data

Mar. 31, 1976 [NL] Netherlands ............... 7603365

[51] Int. Cl.² ................................. A01F 11/00
[52] U.S. Cl. ............................... 130/30 R; 17/1 G; 130/9 R
[58] Field of Search ............ 130/30 R, 9 R, 9 B, 130/9 D; 17/1 G; 99/635, 637, 639, 641; 188/74, 75

[56] References Cited

U.S. PATENT DOCUMENTS

| | | | |
|---|---|---|---|
| 686,071 | 11/1901 | Hogg | 130/30 R |
| 1,978,133 | 10/1934 | Hatch | 99/635 |
| 2,363,152 | 11/1944 | Schnell | 188/74 |
| 2,787,273 | 4/1957 | Kerr | 130/9 B |
| 3,106,265 | 10/1963 | Driesch | 188/75 |
| 3,175,561 | 3/1965 | Oldershaw | 130/30 R |
| 3,252,463 | 5/1966 | Alpen | 130/30 R |
| 3,259,135 | 7/1966 | Heatherington et al. | 130/30 R |
| 3,486,187 | 12/1969 | Zwiep et al. | 17/1 G |
| 3,490,506 | 1/1970 | Guilford | 130/30 R |
| 3,509,886 | 5/1970 | Janssen | 130/30 R |
| 4,022,220 | 8/1977 | Alkemade | 130/30 R |

Primary Examiner—Louis G. Mancene
Assistant Examiner—Paul J. Hirsch
Attorney, Agent, or Firm—McGlew and Tuttle

[57] ABSTRACT

A device for removing attached parts from the stalk of a plant moving downstream along a feed path, and in particular a Brussel sprout plant comprising, an annular member rotatably mounted concentric of the feed path having a central opening through which the plant can pass, a plurality of cutting members pivotally mounted on the annular member in a plane perpendicular to the feed path and a knife portion with a cutting edge connected to each annular member. An electric motor is connected to the annular member for rotating it and causing the cutting members to pivot axially inwardly toward the feed path to cut the Brussel sprouts off the Brussel sprout stalk. The cutting edges of the knife portions are movable in a circular path concentric with the feed path and an opening device is connected to the cutting member for moving the knife portions with the cutting edges radially outwardly and increasing the radius of the circular path taken by the cutting edges. A stalk pulling member is movable from an upstream position between the cutting edges to a downstream position and the pulling member includes a cylindrical outer surface against which the knife portions can bear.

11 Claims, 14 Drawing Figures

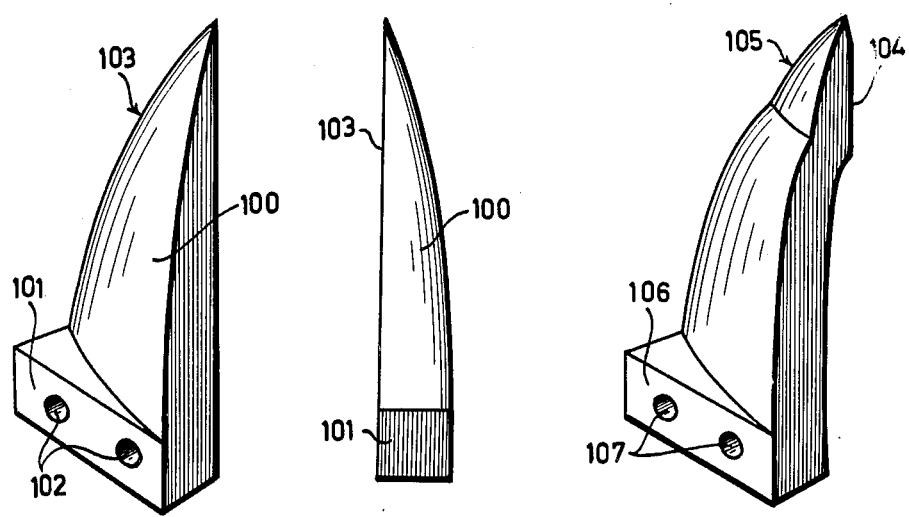
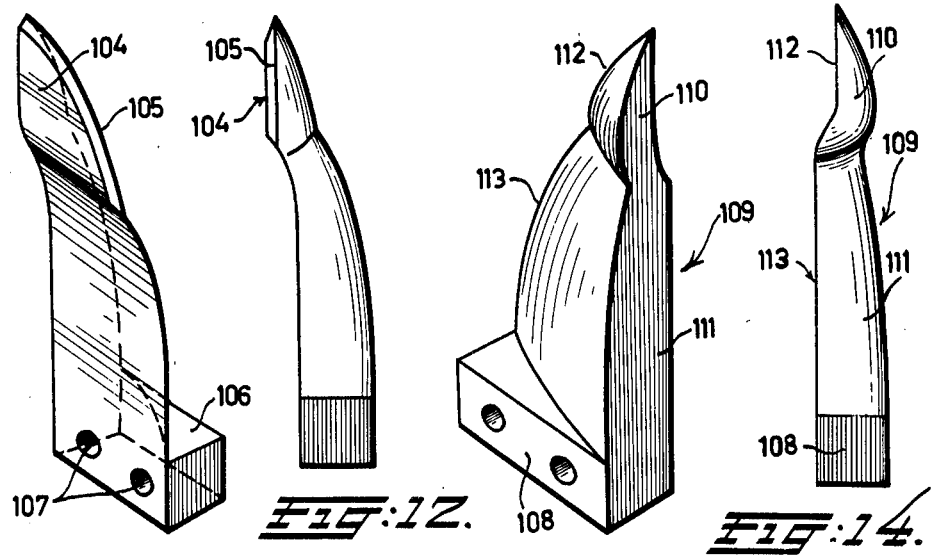

DEVICES FOR REMOVING BRUSSELS SPROUTS FROM THEIR STALKS

BACKGROUND AND FIELD OF THE INVENTION

The invention relates to devices for removing attached parts from the stalk of a plant, such as Brussels sprouts, comprising separation means, consisting of an annular member having an opening the centerline of which substantially coincides with the desired transport trajectory of the plants, and of a number of cutting members which are provided with knives and which are pivotally connected to the annular member in such a way that they can move in a plane perpendicular to the centerline, while the cutting edges of the knives lay substantially along a cylindrical plane, concentrically with the annular member, and of means for pulling the successive stalks through the opening of the annular member.

Such a device is commonly knowledge and similar devices are suited for advanced automation, which not only reduce the expenses, but also augment the safety in using these devices. In general it is far to dangerous to introduce plants into such a device by hand.

The object of the invention is to provide a device which is particularly useful for removing Brussels sprouts from a stalk with a minimum of manual labor.

According to the invention a first step in the direction of the final object, e.g. automation, is achieved with a device, of in which the means of pulling the plants through the device, consists of a cylindrical shaped pulling member substantially concentric to the annular member mentioned above, and which can be moved in an axial direction between a first, front position in between the knives and a second rear position far behind the annular member.

According to a preferred embodiment of the invention the separation means consist of an annular supporting member, which in operation rotates around its centerline, and of a number of bell crank levers pivotally connected to the supporting member, with each bell crank lever having one leg which lies tangentially to the surface of the support member and a second arm which carries a knife, such that from each bell crank lever during rotation the tangentially orientated arm points forwardly and as a result of the centrifugal force moves outwardly while consequently the second arm together with the knife moves inwardly towards the centerline. The invention also includes an annular auxiliar member, which is concentrically disposed inside the supporting member, the second arm of each bell crank lever being connected to this auxiliary member by means of a tenon and mortise joint. Also provided are brake means which can act on the auxiliary member to obtain a relative displacement of the auxiliary member with respect to the driven supporting member, such that consequently the arms with the knife will move outwardly.

According to another embodiment of the invention, the pull means consist of a cylindrical part with an outer diameter which is less than the diameter of the cylindrical opening of the separation member and inside the cylindrical part means are included to catch the bottom part of a stalk. So the pulling means can partly pass through the center of the separation member. With this device it is no longer needed to introduce the plants by hand. This augments the safety of the device. The catch means consist of a conical hole, inside the cylindrical part of the pull means narrowing toward the end. One or more ridges are provided on the inside surface of the hole pointing inwardly. An ejection peg can be placed in the center of the cylindrical part.

The device can also be equiped with guide means for guiding a plant into the pull means.

The guide means consist, in a prefered embodiment, of a funnel shaped member, composed of two halves of a funnel of which each half can be moved on either side of the annular member in a direction between an angle of 20° and 90° with the centerline of the annular member.

The guide means may include a movable push cooperating with a moving belt. The plants are introduced automatically into the pull means. The flap is attached to a piston-rod, which is attached to a tube of rectangular cross-section and which slides in a second tube also of rectangular cross-section. The second tube pivots upon a spindle which is perpendicular to the axis of the second tube, while the spindle is connected to a framework so that the push will not revolve about the axis of the piston rod.

According to an other embodiment of the invention an annular intermediate supporting member is fixed to the supporting member and an annular intermediate auxiliar member is fixed to the auxiliar member, while the bell crank levers are pivotally connected to the intermediate supporting member as well as to the intermediate auxiliar member, so the front part of the separation means can easily be replaced.

According to a preferred embodiment of the invention each knife has the form of a dagger-knife, one side of the blade being a flat plane. The cutting edge of the knife is in this plane.

According to an other embodiment of the invention each knife is divided into two parts. Each part has one flat side with each flat side being substantially parallel to each other. If the tip of the knife is closer to the centerline of the device than, due to the small friction surface, the stalk of the plant will be hollowed better. If the tip part of the knife is farther away from the centerline of the device than the other parts and if both part of the blade of the knife have a cutting edge, it is possible to cut of the sprout from the tail with the first edge and to cut of the tail from the stalk with the second cutting edge of the knife.

The invention may be performed in various ways and one specific embodiment will now be described by way of example with reference to the accompanying drawings.

While specific embodiments of the invention have been shown and described in detail to illustrate the application of the principles of the invention, it will be understood that the invention may be embodied otherwise without departing from such principles.

In the drawings:

FIGS. 8 to 14 are views of multiple embodiments of the knoves in the invention.

DETAILED DESCRIPTION OF PREFERRED EMBODIMENT

Figure 1:
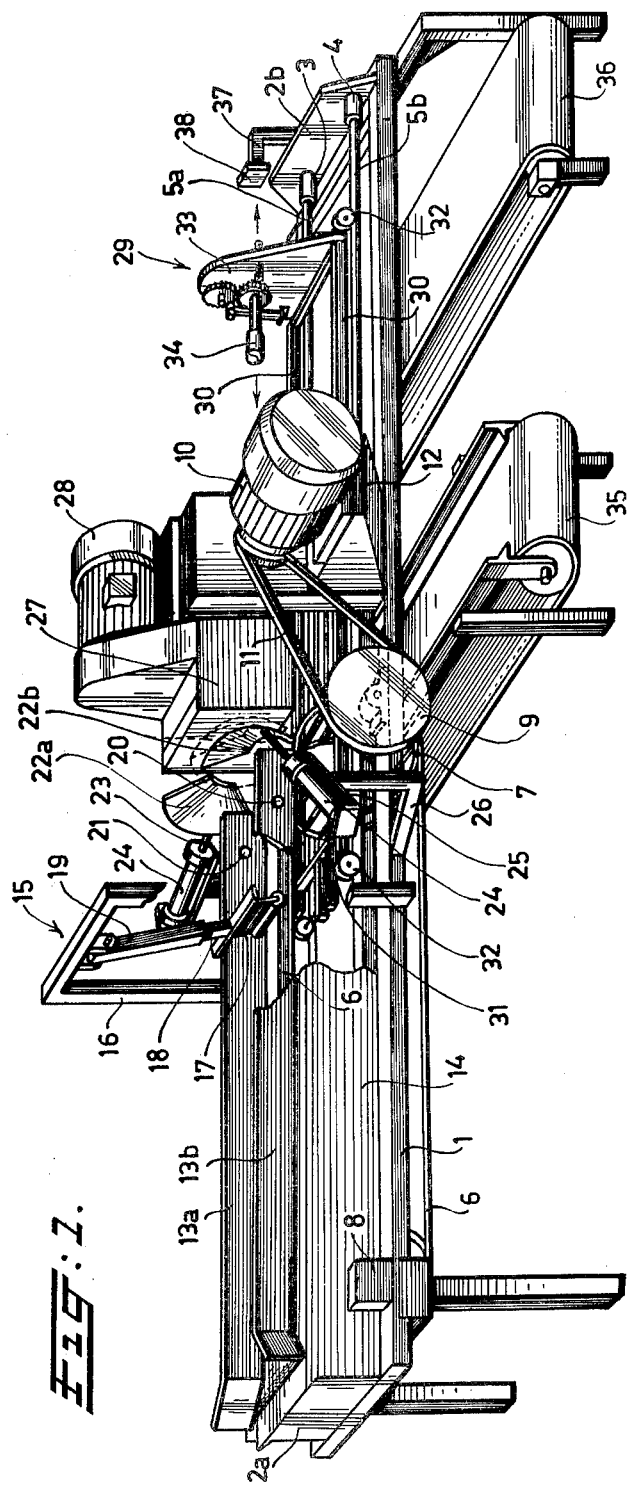
FIG. 1 is a top perspective of one embodiment of the entire device.

FIG. 1 shows a view of a device according to the invention. The device is composed of two upright plates 2a, 2b near the extremities of a frame 1. By means of sockets 3 and 4 two bars 5a and 5b are connected between the two plates 2a and 2b, in this way forming an imaginary guide surface or plane 5.

Between the frame 1 and the bars 5a and 5b a moving belt 6 is placed to move each plant along a feed path. The moving belt 6 runs over two rollers 7. The bearings of the front roller are each placed in a protecting box 8. The moving belt 6 is driven by means of an electric motor 10, a driving belt 11 and a wheel 9, fixed on the axis of one of the rollers. The electric motor is bolted on a supporting plate 12, which is welded to the frame 1.

Upright metal sheets 13a and 13b are provided above and situated on both sides of the moving belt 6. These are needed to guide the plants. The moving belt 6 is shielded by means of a protecting cover 14. To show more details, one of the metal sheets 13b and one of the protecting covers 14 are only partly shown.

The guide means to guide plants along the feed path and into the separation means consist of push means 15 co-operating with the moving belt 6. The push means 15 consist of a frame 16 and a movable pusher member or flap 17. The pusher member or flap 17 is attached to a piston-rod placed inside a tube 18 of a rectangular shape, and slidably into a second tube 19 also of rectangular section and in which is placed an air cylinder. The whole is fixed to the upper part of the frame 16 by means of an axis or pivot hinge.

Means, consisting of an element 20 blowing out an air-current and an element 21 as a receiver of the aircurrent are mounted near by the end of the moving belt 6. The moment the air-current is interrupted by a plant, the receiver element 21 emits a signal, which commands the push means.

Guide means, being two halves of a funnel 22a and 22b, are placed just behind the two elements 20 and 21. Each half funnel 22a and 22b is fixed on the extremity of a piston-rod 23 of an air-cylinder 24. Each air-cylinder 24 is mounted on a support 25, which is fixed to the frame by means of a knee 26. Actuation of cylinders 24 move funnel halves 22a, 22b in a direction having a vector perpendicular to the feed path and at an angle of from 20° to 90° from the feed path or center line.

A separation member is placed inside a casing 27 behind the moving belt 6. The separation member is driven by first drive means in the form of an electric motor 28 placed on top of the casing 27.

The guide surface or plane 5 serves to support pull means, consisting of a carriage 29. The framework of the carriage consists of two longitudinal runners 30 on both sides of the moving belt 6. Two axles 31 with guide wheels 32 are placed near both extremities of the carriage 29. On the far end of the carriage 29 and on an upright plate 33, a cylindrical pull member, like a tube 34, is mounted. This pull member serves to pull the bottom end of a stalk through the separation means. The pull means or stalk pulling means include a drive for moving the carriage 29 in the direction of the arrows in FIG. 1.

Underneath the frame 1, as shown in FIG. 1, two conveyors 35 and 36 can be placed. One of the conveyors 35 is placed unterneath the separation member to convey the cut sprouts and leaves. Instead of the conveyor 35, a shaking conveyor should be used to separate the sprouts from the leaves. The second conveyor 36 is used to transport the stalks.

A stopblock 38 is mounted on a support 37 which is mounted on the upright plate 2b at the near end of the frame 1, to reduce the shock of the carriage when it is stopped.

Figure 2:
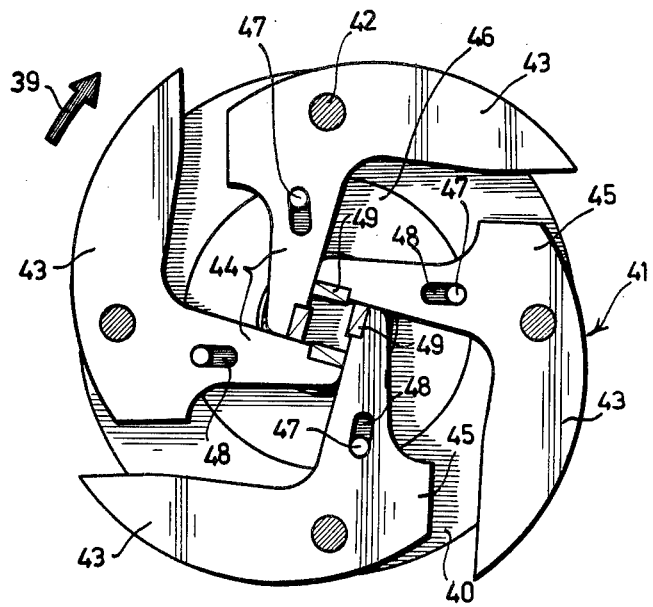
FIGS. 2 and 3 are front elevational detailed views of separation means used in the invention.

FIG. 2 shows the separation means rotating in the direction of the arrow 39. The separation means consist of an annular supporting member 40, with four bellcrank levers pivotally connected to it. Each bell crank lever pivots around an axis of shaft 42 and consists of a first arm 43 which extends generally parallel to a tangent to the annular member 40 and directed forwardly when rotating, and a second arm 44 directed inwardly, and a third arm 45, extending as the arm 43 but in the backwards direction.

An auxiliary member 46 lays coaxially inside the supporting member 40. The second arm 44 of each bell crank lever is connected to the auxiliar member 46 by means of a tenon and mortise joint. The knives 49 each with a cutting edge are placed nearly at the end of the second arms 44 so that they move in a circular path concentric with the feed path.

Figure 3:
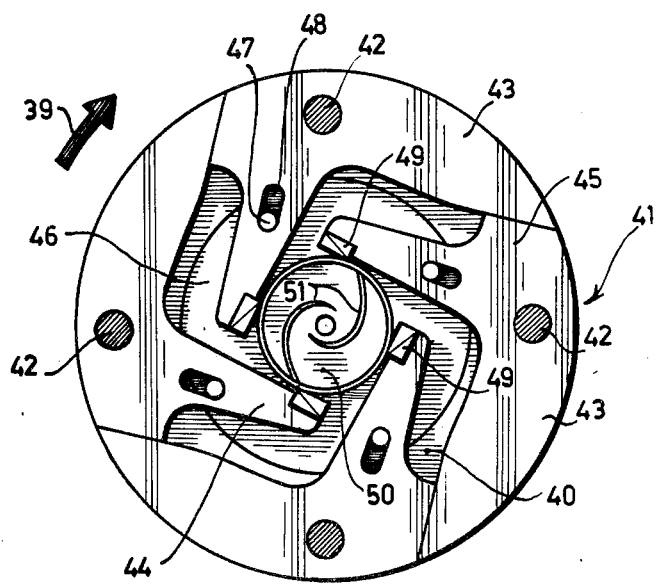

FIG. 3 shows the configuration of the device in FIG. 2; the moment that brakes in the invention work on the auxiliary member 46. Pull means are placed between the knives 49 in a center opening of the auxiliar member 46. From the pull means are shown stalk holding means in the form of the conical hole 50, which narrows towards the end and two ridges 51 pointing inwardly, and erected on the inner surface of the conical hole. See FIG. 5 for a side view.

Figure 4:
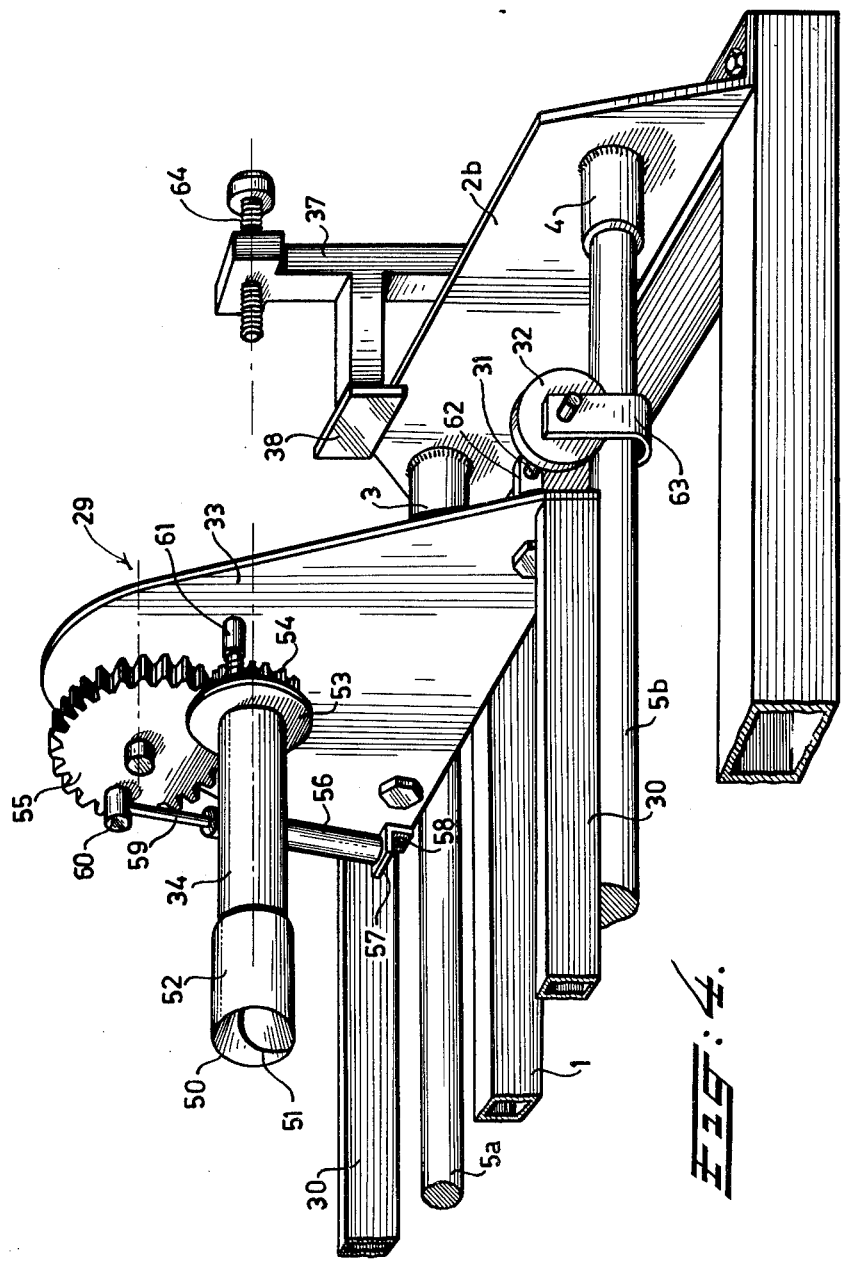
FIG. 4 is a partial top perspective view of pull means in the invention.

FIG. 4 shows an enlarged detail of the device, viz. the stalk pulling means or pull means. The far or downstream end of frame 1 is shown and the upright plate 2b is shown with the two sockets 3 and 4 affixed. The carriage 29 is placed on the two bars 5a, 5b which are fixed into the sockets 3 and 4. Between the longitudinal runners 30 and on the upright plate 33 is placed tube 34. At the end of the tube 34 the cylindrical part 52 with the conical hole 50 and the ridges 51 is mounted. On the tube is erected a ridge or flange 53 and just behind this is a toothed wheel 54 which is fixed on the tube. The toothed wheel 54 is in constant contact with a second toothed wheel or gear 55, which can pivot along a certain distance by means of an air-cylinder 56.

The cylinder 56 is connected to the plate 33 by means of elbow 57 and the axis or pivot point 58. The pistonrod 59 is pivotally connected to the second toothed wheel 55. A switch 61 is fixed on the plate 33 behind the tube 34.

Wheels 32 on their axles 31 are connected to the plate 33 by means of supporting block 62. Retainer brackets 63 prevent the carriage from jumping off the guide surface 5 comprising bars 5a and 5b.

Figure 5:
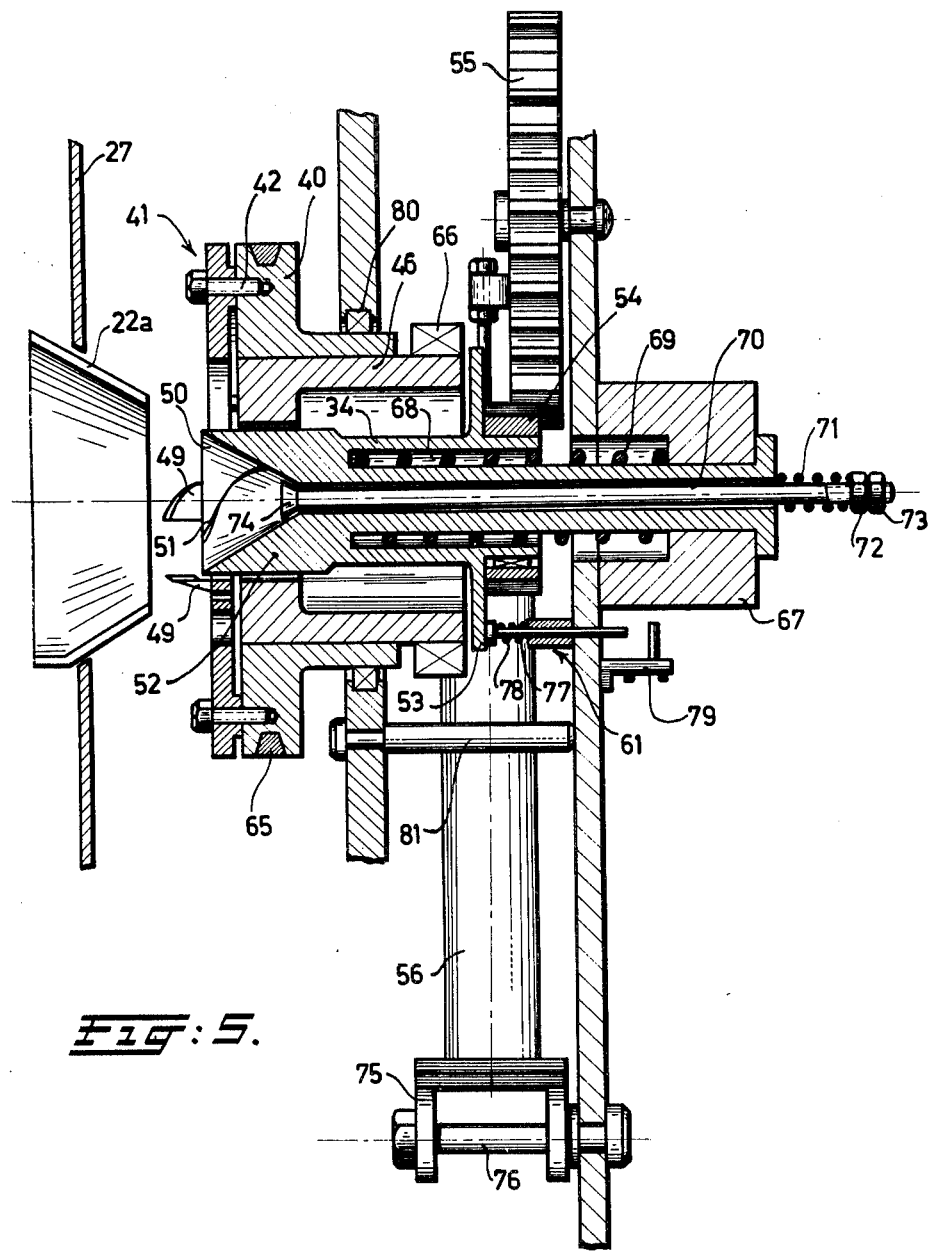
FIGS. 5 and 7 are side sectional views of separation means together with pull means.

An adjusting screw 64 is fixed on the support 37 and co-operates with an ejection pin 70 (FIG. 5)

FIG. 5 gives more in detail the separation means, the pull means and partly the guide means. The separation member consists of the supporting member 40 which is driven by a rope or v-belt 65. Brake means 66 can act on the auxiliar member 46 and comprise opening means for increasing the diameter of the circular path along which the cutting edges of the knives 42 move. The tube 34 can be introduced into the opening when the brake means 66 act on the auxiliar member 46. The pull means consist of the tube 34 with the cylindrical part 52 having the conical hole 50 inside with the ridges 51. The tube 34 can move forwardly and backwardly within a sleeve 67 fixed to the plate 33. A spring 69 in a hole 68 in the tube serves to keep the tube in the forward most or upstream position.

In the tube is places an ejection pin 70 which can co-operate with the screw 64 to eject stalks out of the conical part 52. A spring 71 together with the nuts 72, 73 keeps the ejection pin 70 in the preferred or downstream position. The pin 70 has at the other side a conical part 74.

The air cylinder 56 is here fixed to the plate 33 by means of an element 75 and a bolt 76. Partly shown is one of the half funnels 22a and the casing 27. The switch 61 here consists of a pin 77 and a spring 78. Behind the pin is placed a relay 79.

The supporting member is placed in a bearing 80. A pin 81 fixes the distance the tube 34 can enter into the separation means.

Figure 6:
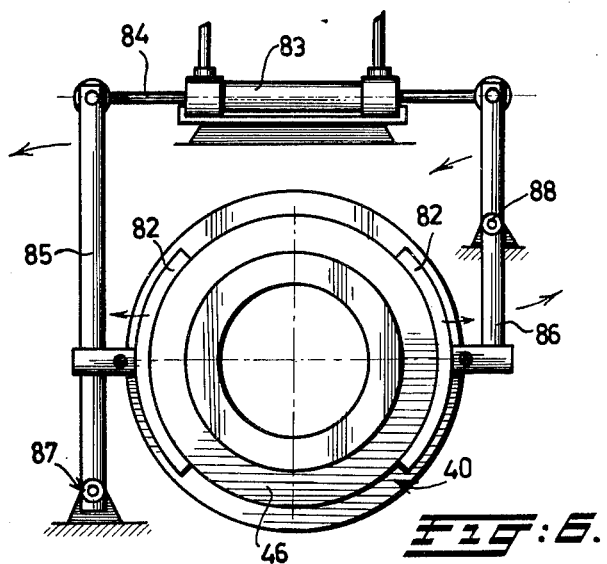
FIG. 6 is a front elevational view of brake means in the invention.

FIG. 6 shows partly the back side of the separation means. Two brake shoes 82 act on the auxiliary member 46. An air cylinder 83 with a piston 84 on both sides can press the brake shoes on the auxiliar member by means of th levers 85, 86. The levers pivot about the axes 87, 88.

Figure 7:
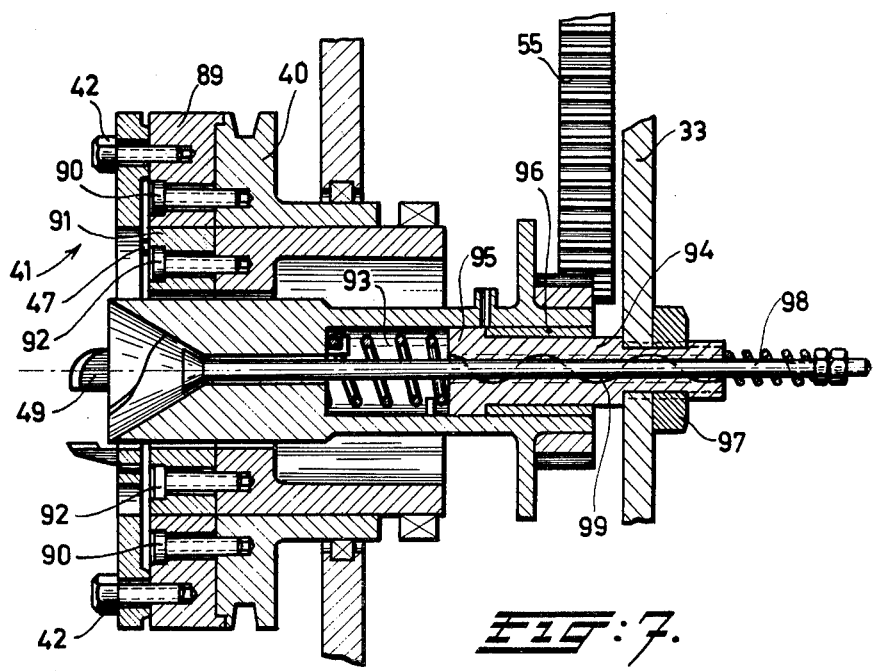

FIG. 7 shows an other embodiment of the separation means. An annular intermediate supporting member 89 is bolted with bolts 90 to the supporting member 40. Also an annular intermediate auxiliar member 91 is fixed on the auxiliar member 46 by means of bolts 92. The bell crank levers are intermediate members 89 and 91. In this embodiment it is easy to replace the separation means, by replacing the intermediate members 89, 91 together with the bell crank levers.

FIG. 7 also shows an other embodiment of the pull means. The tube 34 has a cylindrical hole 93, in which is placed a piston 94 with a head 95. A packing gland 96 has been pinched inside the hole 93 in which the piston 94 can move freely forward and backward. The piston 94 is fixed to the plate 33 by means of a nut 97. An ejection pin 98 with on the outside a screw thread 99 is placed a hole with screw thread 99 in the center of te piston 94. Three different embodiments of the knives 49 are shown in the FIGS. 8 to 14. The first knife has the form of a dagger-knife with a blade 100 and a base 101 in which there is two holes 102 to affix the knife. FIG. 9 shows a side view of the knife towards the cutting edge 103 of the knife.

FIG. 10, 11 and 12 shows an other possible embodiment of a knife. Near the tip of the knife there is a flat plane 104, with an edge 105 parallel to said plane 104. In the base 106 are also two holes 107.

In FIGS. 13 and 14 is shown an knife with a blade 109 and a base 108. The part 110 of the blade is more backwards than the rest part 111 of the blade. Both parts have an edge 112 respectively 113.

In operation the plants are placed on the moving belt 6 with the bottom part of the stalk pointing forwards. As the plants pass partly the flap or pusher member 17 they interrupt the air current from the element 20 towards the element 21. The receiver 21 emits a signal which activate the pushing member pusher together with the moving belt will press the plant through the funnel parts 22a, 22b into the cylindrical part 52. As soon as the plant is pressed into the cylindrical part 52 the switch 61 is pressed against the relay 79, which activates the toothed wheels 55, 54. By turning it around in the right way the bottom of the stalk is pinched into the cylindrical part 52. When the bottom side of the plant is pinched the toothed wheels stop and the pull means drive over the guide surface 5 backwards and at the same time the two funnel parts 22a, 22b move side aways through the action of cylinder 24. Thus the plant passes the separation means and the knives will press against the stalk of the plant as soon as the cylindrical part is no longer between the bell crank levers. The carriage is moved by means of a long air-cylinder (here not visible) which is on the backside of the device.

As soon as the carriage has reached the most backward or downstream position the cylindrical part rotates backwards, such that the stalk falls out the cylindrical part 52. Also useful can be an ejection pin 70, 98.

Next, the carriage goes back to the front position. Just before it reached that position the brakes act on the auxiliary member 46 so the bell crank levers with the knives move in their most outward position leaving an opening in which the cylindrical part is introduced. Than when the brakes no longer act the knives lay against the cylindrical part again the initial state is reached.

What I claim is:

1. A device for removing attached parts from the stalk of a plant moving downstream along a feedpath and, in particular, a Brussel sprout plant comprising, an annular member rotatably mounted concentrically of the feed path having a central opening therethrough through which the plant can pass, a plurality of cutting members pivotally mounted on said annular member in a plane perpendicular to the feed path each having a knife portion, a cutting edge on each of said knife portions each movable along a circular path concentric about the feed path, first drive means connected to said annular member for rotating said annular member and moving said cutting edges along the circular path, said knife portions with said cutting edges being urged radially inwardly toward the feed path through the action of said first drive means, opening means connected to said cutting member for moving said knife portions radially outwardly of the feed path and increasing the diameter of the circular path along which said cutting edges move, stalk pulling means having a pull member with a cylindrical outer surface against which said knife portions can bear, stalk holding means at a downstream end of said pull member for holding a stalk, and pull member drive means connected to said pulling means for moving said pull member to a first upstream position with said cylindrical surface between said knife portions after said opening means have been actuated to move said knife portions radially outwardly and to a second downstream position downstream of said annular member.

2. A device according to claim 1, wherein each of said cutting members comprise a bell crank lever pivotally connected to said annular member having a first arm extending generally parallel to a tangent to said annular member, and a second arm extending radially inwardly toward the feed path, said knife portion connected to said second arm, said knife portion being pivoted radially inwardly toward the feed path by centrifugal force acting on each of said first arms of said bell crank levers when said first drive means rotates said annular member, the device further including an auxiliary annular member axially aligned with said former mentioned annular member and disposed within the central opening in said former mentioned annular member, each bell crank lever pivotally connected to said former mentioned annular member being connected to said auxiliary member by a tenon and mortise joint permitting relative rotation between said former mentioned and auxiliary annular members, said opening means comprising a brake enageable with said auxiliary member for momentarily holding said auxiliary member from rotating with the rotation of said former mentioned annular member and moving said knife portions radially outwardly through the action of said tenon and mortise joint.

3. A device according to claim 1, wherein said holding means further comprises said pull member including a conical opening tapering in the upstream direction along the feed path, and at least one spiral ridge extending from said pull member into said conical opening.

4. A device according to claim 3, further including an ejection peg axially aligned with said pull member and extending therethrough for ejecting stalks held in said pull member by said holding means.

5. A device according to claim 1, further including guide means for guiding a plant toward said pull member, said guide means comprising at least two funnel half-shaped members each movable toward and away from the feed path and at an angle thereto of from about 20° to about 90°.

6. A device according to claim 5, further including pusher means for pushing a plant past said guide means and into said pull member and a conveyor belt under the feed path for moving the plants.

7. A device according to claim 6, wherein said pusher means comprises a piston rod, a first rectangular cross section tube around said piston rod, a cylinder engaged with said piston rod, a second rectangular cross section tube around said cylinder and telescopically engaged with said first rectangular cross section tube, a pusher frame mounted around the feed path and pivotally connected to said second rectangular cross section tube, said first and second rectangular cross section tubes extending at an angle to the feed path.

8. A device according to claim 2, further including an intermediate support member connected to said annular member and an intermediate auxiliary member connected to said auxiliary member, each of said bell crank levers pivotally connected to said intermediate support member and to said intermediate auxiliary member.

9. A device according to claim 1, wherein each of said knife portions comprises a member tapered in the downstream direction of the feed path, said member including a flat plane surface on one side thereof facing radially inwardly toward the feed path which can bear against said cylindrical surface of said pull member.

10. A device according to claim 1, wherein each of said knife portions comprise a member tapered toward the downstream direction of the feed path, said member divided into two parts, each part having a flat plane surface substantially parallel with each other.

11. A device according to claim 10, wherein each part includes an edge which comprises said cutting edge.

* * * * *